United States Patent [19] [11] 3,905,309
Suter [45] Sept. 16, 1975

[54] SECOND DECK SYSTEM
[76] Inventor: Leslie D. Suter, 1721 N. 50th St., Omaha, Nebr. 68104
[22] Filed: Sept. 12, 1974
[21] Appl. No.: 505,240

[52] U.S. Cl. ............... 105/372; 211/100; 220/1.5
[51] Int. Cl.² ...... B61D 3/06; A47F 5/08; B65J 1/02
[58] Field of Search ........... 105/340, 370, 371, 372, 105/375, 422, 423; 114/8, 9; 211/1.3, 17, 94.5, 96, 99–101, 150, 153; 244/118; 296/3, 10, 14, 24 R, 27, 39 R; 220/1.5

[56] References Cited
UNITED STATES PATENTS
1,609,780  12/1926  Shelton ............................. 105/370
2,149,015  2/1939   Giddings ........................... 105/372
3,516,706  6/1970   Bruce ............................. 105/370 X Primary Examiner—M. Henson Wood, Jr.
Assistant Examiner—Gene A. Church
Attorney, Agent, or Firm—Robert A. Ostmann

[57] ABSTRACT

The disclosure concerns a non-removable, self-storing second deck system for a freight compartment, such as the trailer of a tractor-trailer freight-carrying vehicle. The system includes a plurality of panels, each of which is pivotally connected at one end to slides held captive in vertical guideways fixed to opposing faces of an adjacent pair of wall posts of the compartment. The opposite end of each panel is selectively engageable with a horizontal support member extending between the opposing faces of the corresponding posts of the opposite compartment wall and which restrains the panel against transverse movement. When stored, the panels form a liner for one of the compartment walls.

4 Claims, 4 Drawing Figures

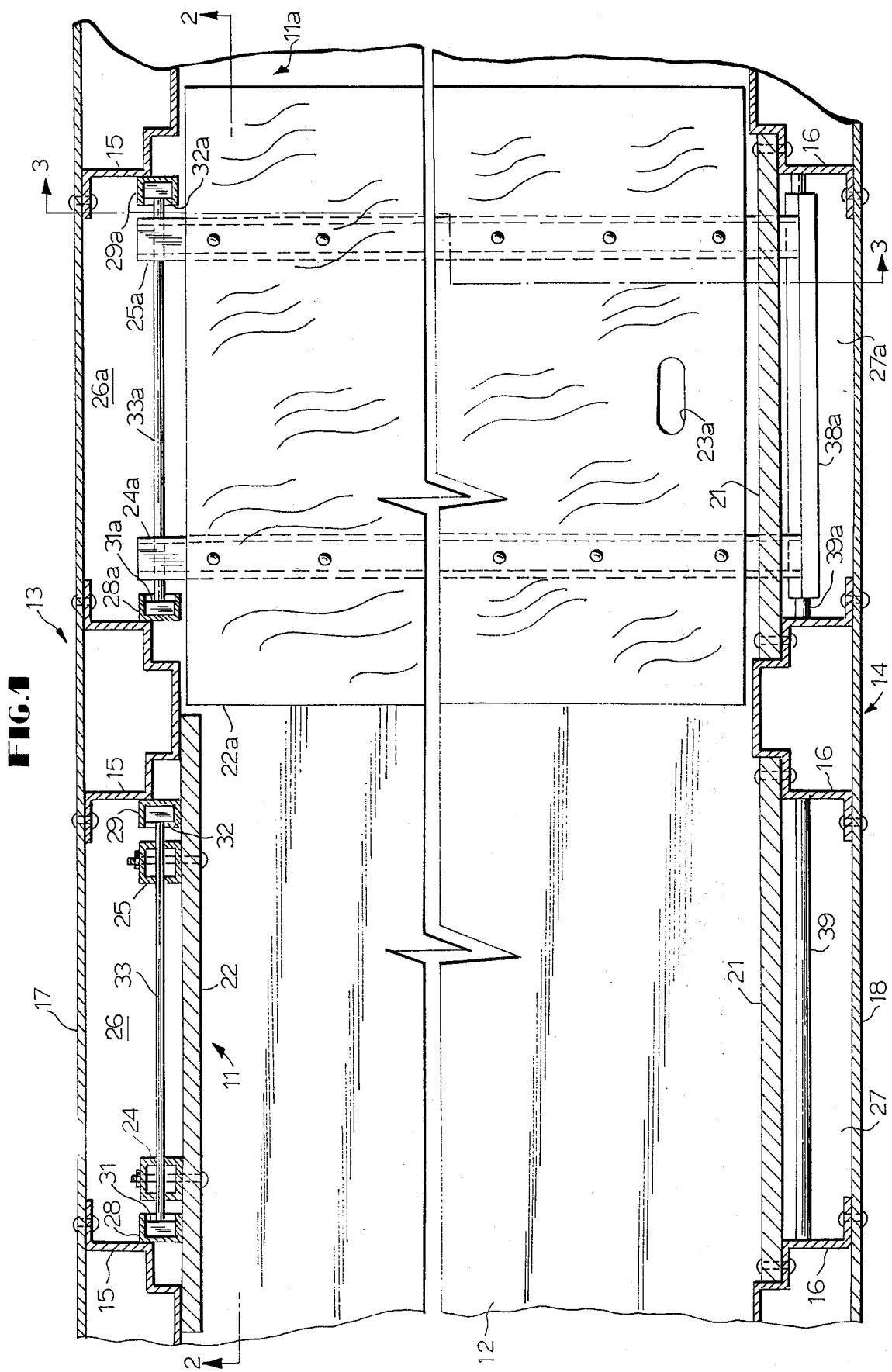

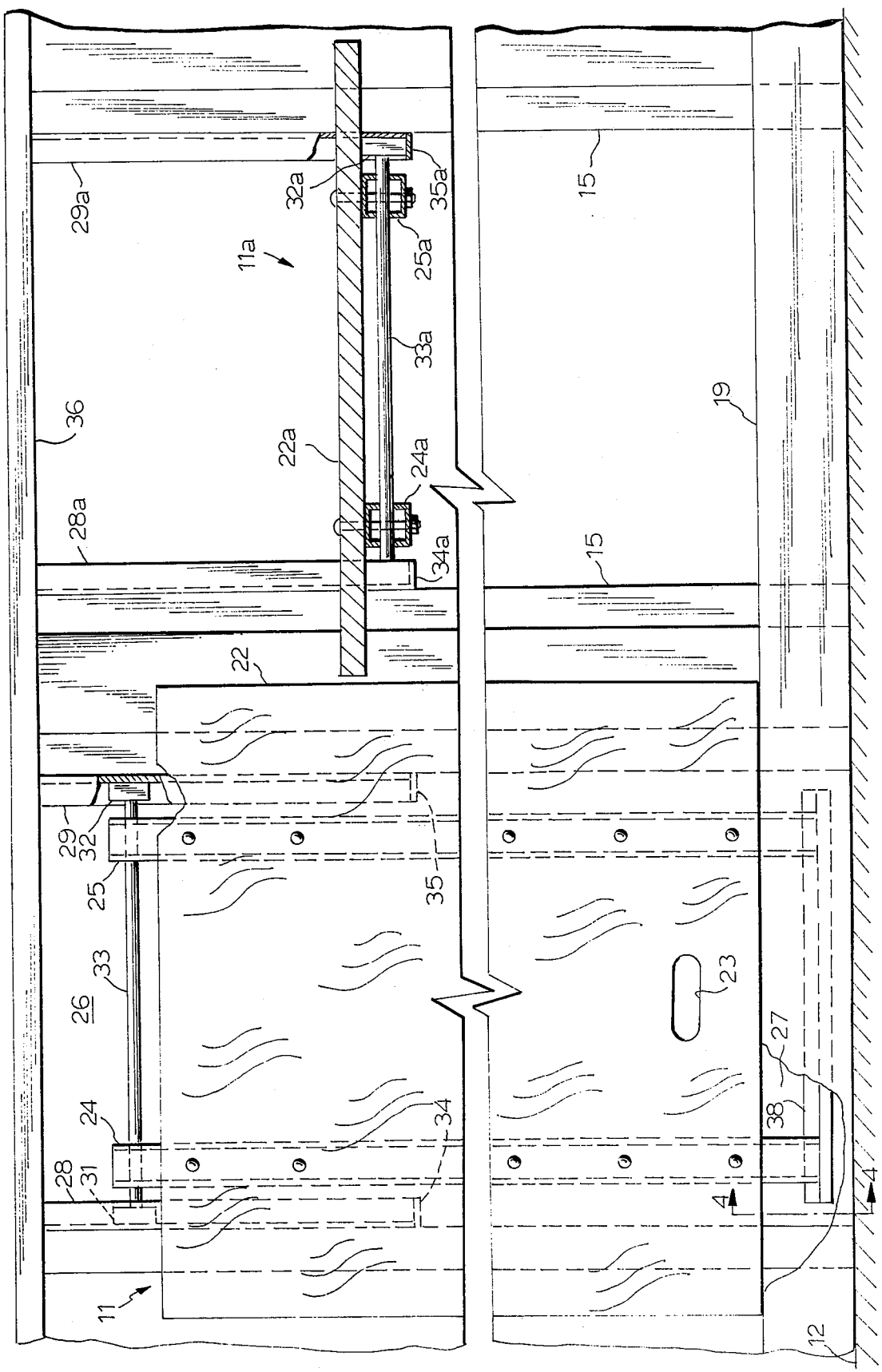

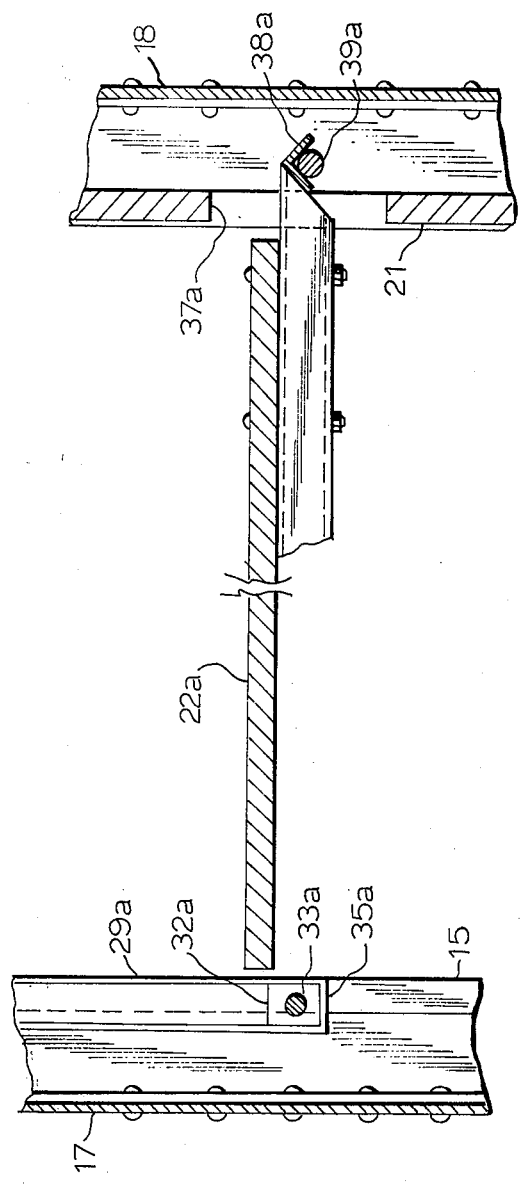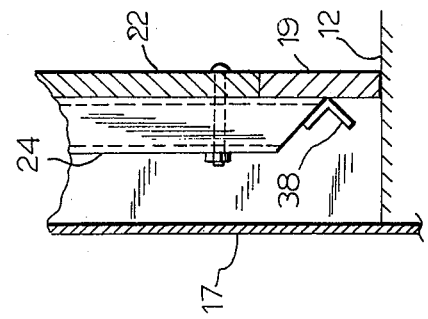

SECOND DECK SYSTEM

BACKGROUND AND SUMMARY OF THE INVENTION

There are available today on the commercial market various systems for providing a second deck, i.e., a load-carrying deck intermediate the floor and roof, in freight compartments, such as railway cars and highway trailers. One type of system employs easily removable components. It has been found unattractive because of the cost of repeated replacement of components lost or stolen during service. Another type of system uses parts which are permanently fixed to the structure of the freight compartment. These non-removable systems eliminate the losses encountered with the first system, but, in general, they entail one or more other disadvantages, such as high initial cost, undue complexity, or excessive consumption of space.

The object of this invention is to provide an improved second deck system which is free of the disadvantages of the prior systems of which I am aware, and which, in addition, affords desirable features not heretofore available. According to the invention, the new system comprises a plurality of separate panel sections, each of which includes a deck section which is pivotally connected at one end to slides held captive in vertical guideways fixed to the opposing faces of an adjacent pair of wall posts of the compartment. Each deck section is sized to extend across the entire width of the compartment, and, at its free end, it is adapted to engage a horizontal support member extending between the corresponding pair of posts of the opposite compartment wall. By a combination of lifting and swinging motions, the deck sections may be moved between vertical storage positions, in which they lie along one compartment wall, and load-carrying positions in which they extend horizontally across the compartment.

The new system affords many advantages, of which the following are particularly noteworthy:

1. It may be installed as original equipment in new compartments or as a retro-fit in existing compartments.
2. The components are permanently connected to the compartment structure, so losses attributable to carelessness or theft are minimized.
3. The panels may be used singly or in groups of any desired number, and they can be easily and quickly shifted between the storage and active positions by one man.
4. When in storage position, the panels consume little inside width, perform the additional function of a wall liner, and offer no protrusions which could damage freight.
5. The system is simple, requiring no cables, or latches or mechanisms which could result in false positioning.
6. When the panels are in the active position, applied loads are transmitted directly to the wall posts without distortion. Moreover, in this position, the panels from rigid links interconnecting the side walls, and thereby keep those walls in alignment.

BRIEF DESCRIPTION OF THE DRAWINGS

The preferred embodiment of the invention is described herein with reference to the accompanying drawings, in which:

FIG. 1 is a horizontal sectional view through a portion of a typical highway trailer incorporating the new system, the view showing one deck section in storage position, and a second section in load-carrying position.

FIG. 2 is a sectional view taken on line 2—2 of FIG. 1.

FIG. 3 is a sectional view taken on line 3—3 of FIG. 1 and rotated 90° counterclockwise.

FIG. 4 is a sectional view taken on line 4—4 of FIG. 2.

DETAILED DESCRIPTION OF ILLUSTRATED EMBODIMENT

The drawings show two panel sections 11 and 11a of the improved system installed in a highway trailer which includes a floor 12 and a pair of side walls 13 and 14. Each of these walls comprises a plurality of longitudinally spaced, vertical posts 15 or 16 to which is attached an outer sheathing 17 or 18 and a scuff strip. Only the scuff strip 19 of wall 13 is illustrated. Wall 14 includes plywood liner panels 21, but, in contrast to the conventional one-piece panels, each of the panels here is divided into two parts by cutting away an intermediate portion in the region of the elevation of the second deck. The purpose of this alteration will become evident as the description proceeds. As in the case of the normal trailer, the width of the storage space of this trailer is considerably smaller than the height.

The two panel sections 11 and 11a are identical, but they are shown in different positions. Therefore, while corresponding parts of the two are identified by the same numerals, the set belonging to section 11a will be distinguished by the addition of the postcript *a*.

As shown in the drawings, panel section 11 includes a rigid deck section composed of a rectangular plywood deck 22 which is provided with a hand hole 23 and which is bolted to a pair of parallel beams 24 and 25 formed of square tubing. The deck 22 has a width just slightly less than the center-line spacing of the posts 15 and 16, and a length just slightly less than the width of the storage space (i.e., the distance between the inboard faces of opposite posts 15 and 16). Beams 24 and 25, on the other hand, are longer, so that the supports for opposite ends of the deck section can be located in the recesses 26 and 27 between adjacent posts 15 and 16, respectively.

A pair of channels 28 and 29 are welded to the opposing faces of the posts 15 which bound recess 26, and these members serve as vertical guideways for sliding blocks 31 and 32 respectively, which are received therein. The blocks 31 and 32 are welded to the opposite ends of a round rod 33 which extends horizontally between them and passes through holes in the beams 24 and 25. Thus, the rod 33 serves as a pivot for one end of the deck section. The lower ends of channels 28 and 29 are closed by plates 34 and 35 which are welded in place, and the upper ends are closed by the cap strip 36 of wall 13. Therefore, the blocks 29 and 32 are captive in the guideways, and, as a result, the deck section cannot be easily removed from the trailer. Plates 34 and 35 also serve as stops which limit downward motion of the sliding blocks, and which consequently define the elevation of one end of the deck section when the latter is in load-carrying position.

In the load-carrying position of the deck section, the free ends of beams 24 and 25 project into recess 27 through an access opening (see opening 37a in FIG. 4) in liner panel 21 formed by removal of the intermediate portion mentioned earlier. These ends of the beams are beveled and welded to a crossing angle member 38. This member is arranged to receive and seat on a round horizontal rod 39 which is welded to the opposing faces of the posts 16 which bound space 27. The elevation of this support is coordinated with that of the support at the opposite end of the deck section so that the deck 22 will be horizontal when the section is in load-carrying position. The interaction between angle member 38 and rod 39 restrains the deck section against movement toward and away from trailer wall 14; therefore, since the deck section is rigid and its other end is fixed to wall 13, the section acts to maintain the two walls of the trailer in alignment.

When a second deck is not required in the trailer, all of the panel sections of the improved systems are placed in the storage position in which section 11 is illustrated. In this position, the deck 22 of each section overlies the inboard faces of adjacent posts 15 and rests on the upper edge of scuff strip 19 (see FIG. 4). The ends of beams 24 and 25, and the connected angle member 38, are positioned in recess 26 behind the scuff strip, so the panel section is effectively locked in place. In this case, the decks 22 are aligned in a vertical plane and define a liner for wall 13. Since support rods 39 are recessed behind liner panels 21, and the stored deck sections isolate beams 24 and 25 and the associated support and guideway apparatus from the freight storage space of the trailer, it should be apparent that the improved system does not introduce obstructions or projections which might damage the lading.

One man can easily move a deck section to the active or load-carrying position in which section 11a is illustrated. To accomplish this, he places one hand in hole 23, lifts the section a few inches so that angle member 38 clears the upper edge of scuff strip, and then pivots the section about rod 33 to move the angle member and the adjacent ends of beams 24 and 25 through access opening 37 and into recess 27. Finally, using both hands, the operator lowers the section to bring slide blocks 31 and 32 into contact with stop plates 34 and 35, respectively, and to seat angle member 38 on rod 39. The sections may be activated singly, or in groups of any desired number, or all of the sections may be utilized together to provide a continuous second deck extending throughout the length of the trailer. The configuration selected depends solely upon the nature of the cargo to be loaded, provided that the floor area adjacent the sections is free of obstructions which would block their pivotal movement.

A panel section is returned to storage position by reversing the sequence of manipulations just mentioned. In other words, the operator inserts one hand in hole 23 and lifts the adjacent end of the deck section as needed to bring angle member 38 clear of rod 39, then, using both hands, he raises the other end of the section while pivoting the first end downward, and, finally, when the deck is vertical, he lowers the section until deck 22 abuts scuff strip 19.

I claim:

1. A self-storing, non-removable system for selectively providing a second deck intermediate the floor and roof of a freight compartment, the compartment having a pair of side walls which are spaced apart a distance not greater than the height of the compartment and each of which is provided with sheathing and longitudinally spaced, vertical posts which project inward from the sheathing, the system comprising a plurality of panel sections, each of which includes;
   a. vertical guideways fixed to opposing faces of a pair of adjacent posts of the first wall, and a horizontal support member fixed to and extending between opposing faces of a corresponding pair of posts of the second wall;
   b. a slide captive in and movable along each guideway;
   c. a rectangular, rigid deck section having a width comparable to the longitudinal spacing of the posts and a length comparable to the transverse distance between the side walls;
   d. means connecting the first end of the deck section to the slides for pivotal movement about a horizontal axis;
   e. support means fixed to the second end of the deck section and adapted to engage the support member to support that end of the section and to prevent relative transverse movement between the section and the second side wall, the support means being adapted to be disengaged from the support member by upward movement of the second end of the deck section;
   f. stop means reacting between the posts of the first wall and the first end of the deck section for supporting that deck end at the same elevation as the second end; and
   g. a horizontal retaining member attached to and spanning the posts of the first wall and located adjacent the compartment floor,
   h. whereby the deck section has a load-supporting position in which it extends horizontally across the compartment and is supported at its opposite ends by the stop means and the support member and from which it may be shifted, by a combination of vertical and pivotal motion, to a vertical storage position in which it overlies the posts of the first wall and is held in place by coaction between the support means and the retaining member.

2. A system as defined in claim 1 in which
   a. said deck section comprises a pair of parallel beams which extend between the region of the guideways at the first wall and the region of support member at the second wall, and to which is attached a flat, rectangular deck; and
   b. said means connecting the first end of the deck section to the slides comprises a horizontal rod which is attached at its opposite ends to the slides and on which the beams are pivotally mounted.

3. A system as defined in claim 2 in which
   a. the support member is a round bar; and
   b. the support means comprises an elongated, angle-shaped member which is attached to the ends of the beams adjacent the second wall and is arranged to receive and seat upon the round bar when the deck section is in load-supporting position.

4. A system as defined in claim 2 in which
   a. said guideways are channel-shaped members which open towards each other;
   b. said slides are blocks received in the channel-shaped members; and
   c. said stop means comprises a pair of members, one being attached to each channel-shaped guideway at its lower end and arranged to arrest downward movement of the associated slide block in the guide-way.

\* \* \* \* \*